US012770655B2

(12) United States Patent
Fibaek

(10) Patent No.: US 12,770,655 B2
(45) Date of Patent: Oct. 20, 2026

(54) AUDIO PROCESSING

(71) Applicant: Blackmagic Design Pty Ltd, Port Melbourne (AU)

(72) Inventor: Tino Fibaek, Sydney (AU)

(73) Assignee: Blackmagic Design Pty Ltd, South Melbourne (AU)

( * ) Notice: Subject to any disclaimer, the term of this patent is extended or adjusted under 35 U.S.C. 154(b) by 229 days.

(21) Appl. No.: 17/984,117

(22) Filed: Nov. 9, 2022

(65) Prior Publication Data

US 2023/0142302 A1 May 11, 2023

(30) Foreign Application Priority Data

Nov. 9, 2021 (AU) ................................ 2021903578

(51) Int. Cl.
*G11B 27/031* (2006.01)

(52) U.S. Cl.
CPC .................................. *G11B 27/031* (2013.01)

(58) Field of Classification Search
CPC . G06F 3/16; G06F 3/162; G06F 16/60; G06F 17/00; G06F 16/4393
USPC ............................................................ 700/94
See application file for complete search history.

(56) References Cited

U.S. PATENT DOCUMENTS 11,183,160 B1 * 11/2021 Lerman .................. G10H 1/368
2005/0070239 A1 * 3/2005 Paulus ..................... H04B 1/28 455/205
2006/0112390 A1 5/2006 Hamaoka
2011/0292290 A1 * 12/2011 Aizawa .................. H03D 7/165 348/E5.077

(Continued)

FOREIGN PATENT DOCUMENTS

WO 2014/055961 A2 4/2014

OTHER PUBLICATIONS

Colmenares, J. A. et al., "Real-Time Musical Applications on an Experimental Operating System for Multi-Core Processors", Proceedings of the International Computer Music Conference 2011, University of Huddersfield, UK, Jul. 31-Aug. 5, 2011, p. 216-223, 8 pgs.

(Continued)

*Primary Examiner* — Alexander Krzystan
(74) *Attorney, Agent, or Firm* — Sced Intellectual Property Law Group LLP

(57) ABSTRACT

A method of a performing a plurality of processing operations on a plurality of audio entities using a computer system having multiple data processing units includes allocating each data processing operation to one of the data processing units, such that the data processing operation is performed on said one of the data processing units. The allocation is based at least partly on an expected execution time for the data processing operation on said one of the data processing units to which it is allocated. The method further includes performing the plurality of processing operations on said plurality of audio entities according to the allocation and outputting processed audio. Allocating each data processing operation to one of the data processing units includes identifying one or more realtime processing operations that must be performed in a predetermined time period, and allocating said realtime processing operations to be performed before non-realtime processing operations.

25 Claims, 11 Drawing Sheets

(56) References Cited

U.S. PATENT DOCUMENTS

| | | | | |
|---|---|---|---|---|
| 2017/0257879 | A1* | 9/2017 | Kang | H04W 74/0816 |
| 2019/0012133 | A1* | 1/2019 | Reilly | G06F 11/3428 |
| 2022/0407984 | A1* | 12/2022 | Rockel | H04N 21/242 |
| 2023/0142302 | A1* | 5/2023 | Fibaek | G06F 9/50<br>700/94 |

OTHER PUBLICATIONS

Ausin, D. S. et al., "Real-Time Audio Processing on the T-CREST Multicore Platform", IEEE 11th International Symposium on Embedded Multicore/Many-core Systems-on-Chip, 2017, p. 120-127, 8 pgs.

Ausin, D. S., "Audio Processing on a Multicore Platform", Technical University of Denmark, 2017, 164 pgs.

* cited by examiner

| Single Core | |
|---|---|
| **Core 1** | **Time** |
| Track 1 Playback | 1 |
| Track 1 Processing | 2 |
| Add track 1 to Bus 1 | 3 |
| Track 2 Playback | 4 |
| Track 2 Processing | 5 |
| Add Track 2 to Bus 1 | 6 |
| Track 3 Playback | 7 |
| Track 3 Processing | 8 |
| Add Track 3 to Bus 1 | 9 |
| Track 4 Playback | 10 |
| Track 4 Processing | 11 |
| Add Track 4 to Bus 1 | 12 |
| Bus 1 Processing | 13 |
| Bus 1 Output | 14 |
| ***Output Ready*** | **15** |

*Fig. 2*

| Quad Core | | | | |
|---|---|---|---|---|
| **Core 1** | **Core 2** | **Core 3** | **Core 4** | **Time** |
| Track 1 Playback | Track 2 Playback | Track 3 Playback | Track 4 Playback | 1 |
| Track 1 Processing | Track 2 Processing | Track 3 Processing | Track 4 Processing | 2 |
| | | | Add Track 1 to Bus 1 | 3 |
| | | | Add Track 2 to Bus 1 | 4 |
| | | | Add Track 3 to Bus 1 | 5 |
| | | | Add Track 4 to Bus 1 | 6 |
| | | | Bus 1 Processing | 7 |
| | | | Bus 1 Output | 8 |
| | | | ***Output Ready*** | **9** |

*Fig. 3*

| Quad Core | | | | |
|---|---|---|---|---|
| **Core 1** | **Core 2** | **Core 3** | **Core 4** | **Time** |
| Track 1 Playback | Track 2 Playback | Track 3 Playback | Track 4 Playback | 1 |
| Track 1 Processing | Track 2 Processing | Track 3 Processing | Track 4 Processing | 2 |
| | | | Add track 4 to Bus 1 | 3 |
| | | | Add Track 2 to Bus 1 | 4 |
| | | | Add Track 3 to Bus 1 | 5 |
| | | | Add Track 1 to Bus 1 | 6 |
| | | | Bus 1 Processing | 7 |
| | | | Bus 1 Output | 8 |
| | | | ***Output Ready*** | **9** |

*Fig. 4*

| | Primitives/Processing operations | | | | | | | | |
|---|---|---|---|---|---|---|---|---|---|
| Processing unit | P1 | P2 | P3 | P3.2 | P3.3 | P4 | P5 | P6 | P7 |
| U1 | 1.01 | 1.02 | 1.04 | 1.151 | 1.091 | 2.02 | 1.99 | 4.121 | 1.061 |
| U2 | 1.02 | 1.03 | 1.051 | 1.163 | 1.102 | 2.04 | 2.009 | 4.162 | 1.071 |
| U3 | 1.04 | 1.05 | 1.071 | 1.186 | 1.123 | 2.08 | 2.049 | 4.243 | 1.092 |
| U4 | 1 | 1.01 | 1.03 | 1.14 | 1.08 | 2 | 1.97 | 4.08 | 1.05 |
| U5 | 1.03 | 1.04 | 1.061 | 1.174 | 1.112 | 2.06 | 2.029 | 4.202 | 1.082 |
| U6 | 1.08 | 1.091 | 1.112 | 1.231 | 1.166 | 2.16 | 2.128 | 4.406 | 1.134 |
| U7 | 1.08 | 1.091 | 1.112 | 1.231 | 1.166 | 2.16 | 2.128 | 4.406 | 1.134 |
| U8 | 1.09 | 1.101 | 1.123 | 1.243 | 1.177 | 2.18 | 2.147 | 4.447 | 1.145 |
| U9 | 1.07 | 1.081 | 1.102 | 1.22 | 1.156 | 2.14 | 2.108 | 4.366 | 1.124 |
| U10 | 1.06 | 1.071 | 1.092 | 1.208 | 1.145 | 2.12 | 2.088 | 4.325 | 1.113 |
| U11 | 1.1 | 1.111 | 1.133 | 1.254 | 1.188 | 2.2 | 2.167 | 4.488 | 1.155 |
| U12 | 1.02 | 1.03 | 1.051 | 1.163 | 1.102 | 2.04 | 2.009 | 4.162 | 1.071 |

*Fig. 6*

| Channel | Primitives/Processing operations | | | | | |
|---|---|---|---|---|---|---|
| 1 | P1 | P2 | P3 | P3.3 | P4 | |
| 2 | P2 | | | | | |
| 3 | P2 | | | | | |
| 4 | P2 | | | | | |
| 5 | P2 | | | | | |
| 6 | P2 | | | | | |
| 7 | P2 | | | | | |
| 8 | P1 | P2 | P3 | P3.2 | P3.3 | P4 |
| 9 | P3.2 | P2 | | | | |
| 10 | P3.2 | P2 | | | | |
| 11 | P2 | P3 | P7 | | | |
| 12 | P4 | P2 | | | | |
| 13 | P3.2 | P2 | | | | |
| 14 | P2 | P3 | | | | |
| 15 | P3.2 | P2 | | | | |
| 16 | P4 | P2 | | | | |
| 17 | P3.2 | P2 | | | | |
| 18 | P2 | P3 | | | | |
| 19 | P2 | | | | | |
| 20 | P3.3 | P2 | | | | |
| 21 | P1 | P2 | | | | |
| 22 | P2 | P3 | | | | |
| 23 | P2 | | | | | |
| 24 | P1 | P2 | | | | |
| 25 | P4 | P2 | | | | |
| 26 | P5 | P2 | | | | |
| 27 | P2 | | | | | |
| 28 | P2 | P3 | | | | |
| 29 | P2 | | | | | |
| 30 | P4 | P2 | P3 | | | |
| 31 | P2 | | | | | |
| 32 | P2 | P3 | | | | |
| 33 | P2 | | | | | |
| 34 | P7 | P2 | | | | |
| 35 | P3.3 | P2 | | | | |
| 36 | P6 | P3.2 | P4 | P2 | | |
| 37 | P4 | P2 | | | | |
| 38 | P1 | P2 | | | | |

*Fig. 8*

<table>
<tr><th></th><th colspan="9">Time</th></tr>
<tr><th>Processing unit</th><th>1</th><th>2</th><th>3</th><th>4</th><th>5</th><th>6</th><th>7</th><th>8</th><th>Total time</th></tr>
<tr><td>U1</td><td>AE1 P1</td><td>AE1 P3</td><td>AE1 P3.3</td><td colspan="2">AE1 P4</td><td>AE1 P2</td><td>AE13 P3.2</td><td>AE13 P2</td><td>8.19</td></tr>
<tr><td>U2</td><td>AE8 P1</td><td>AE8 P3</td><td>AE8 P3.2</td><td>AE8 P3.3</td><td colspan="2">AE8 P4</td><td>AE8 P2</td><td></td><td>7.24</td></tr>
<tr><td>U3</td><td>AE31 P2</td><td>AE33 P2</td><td>AE22 P2</td><td>AE34 P7</td><td>AE34 P2</td><td>AE32 P3</td><td>AE32 P2</td><td></td><td>7.487</td></tr>
<tr><td>U4</td><td colspan="4">AE36 P6</td><td>AE36 P3.2</td><td colspan="2">AE36 P4</td><td>AE36 P2</td><td>8.276</td></tr>
<tr><td>U5</td><td colspan="2">AE37 P4</td><td>AE37 P2</td><td>AE2 P2</td><td>AE27 P2</td><td colspan="2">AE35 P3.3</td><td>AE35 P2</td><td>7.333</td></tr>
<tr><td>U6</td><td>AE18 P3</td><td>AE18 P2</td><td colspan="2">AE25 P4</td><td>AE25 P2</td><td>AE21 P1</td><td>AE21 P2</td><td>AE6 P2</td><td>7.787</td></tr>
<tr><td>U7</td><td>AE28 P3</td><td>AE28 P2</td><td colspan="2">AE26 P5</td><td>AE26 P2</td><td>AE23 P2</td><td>AE17 P3.2</td><td>AE17 P2</td><td>7.948</td></tr>
<tr><td>U8</td><td>AE22 P3</td><td>AE22 P2</td><td>AE9 P3.2</td><td>AE9 P2</td><td>AE24 P3</td><td>AE24 P2</td><td>AE7 P2</td><td></td><td>7.797</td></tr>
<tr><td>U9</td><td colspan="2">AE16 P4</td><td>AE16 P2</td><td>AE10 P3.2</td><td>AE10 P2</td><td>AE29 P2</td><td>AE19 P2</td><td></td><td>7.683</td></tr>
<tr><td>U10</td><td>AE20 P3.3</td><td>AE20 P2</td><td>AE15 P3.2</td><td>AE15 P2</td><td>AE3 P2</td><td>AE4 P2</td><td>AE5 P2</td><td></td><td>7.813</td></tr>
<tr><td>U11</td><td colspan="2">AE12 P4</td><td>AE12 P2</td><td colspan="2">AE30 P4</td><td>AE30 P3</td><td>AE30 P2</td><td></td><td>7.755</td></tr>
<tr><td>U12</td><td>AE11 P3</td><td>AE11 P7</td><td>AE11 P2</td><td>AE14P3</td><td>AE14 P2</td><td>AE38 P1</td><td>AE38 P2</td><td></td><td>7.283</td></tr>
</table>

*Fig. 9*

| Quad core | | | | |
|---|---|---|---|---|
| | | ***Slice t-1*** | | |
| **Core 1** | **Core 2** | **Core 3** | **Core 4** | **Time** |
| Add track 1 to Bus 1 (t-2) | Track 1 Playback (t-1) | Track 3 Playback (t-1) | Track 4 Playback (t-1) | 1 |
| Add Track 2 to Bus 1 (t-2) | Track 1 Processing (t-1) | Track 3 Processing (t-1) | Track 4 Processing (t-1) | 2 |
| Add Track 3 to Bus 1 (t-2) | Track 2 Playback (t-1) | | | 3 |
| Add Track 4 to Bus 1 (t-2) | Track 2 Processing (t-1) | | | 4 |
| Bus 1 Processing (t-2) | | | | 5 |
| Bus 1 Output (t-2) | | | | 6 |
| ***Output Ready*** | | | | 7 |

| | | ***Slice t*** | | |
|---|---|---|---|---|
| **Core 1** | **Core 2** | **Core 3** | **Core 4** | **Time** |
| Add track 1 to Bus 1 (t-1) | Track 1 Playback (t) | Track 3 Playback (t) | Track 4 Playback (t) | 1 |
| Add Track 2 to Bus 1 (t-1) | Track 1 Processing (t) | Track 3 Processing (t) | Track 4 Processing (t) | 2 |
| Add Track 3 to Bus 1 (t-1) | Track 2 Playback (t) | | | 3 |
| Add Track 4 to Bus 1 (t-1) | Track 2 Processing (t) | | | 4 |
| Bus 1 Processing (t-1) | | | | 5 |
| Bus 1 Output (t-1) | | | | 6 |
| ***Output Ready*** | | | | 7 |

*Fig. 10*

AUDIO PROCESSING

BACKGROUND

Technical Field

The present disclosure relates to audio processing. The illustrative embodiments will be described in the context of processing audio associated with producing a movie.

Description of the Related Art

Modern video editing systems including those used professionally in the film and television industry are typically software applications that are used to assemble a production made up of one or more scenes from a collection of constituent elements in the form of digital files and/or data streams. Video editing systems allow these constituent elements—which may include, inter alia, video files, images, animations, titles, audiovisual clips, audio files and associated metadata—to be imported and edited before being merged into the final production.

Digital movie production often uses multiple audio tracks for a scene being produced. For example separate audio tracks might be used for:

a) dialogue—possibly one per character;

b) single background sounds of or groups of background sounds from different sources;

c) sound effects;

d) music;

e) voiceover and/or overdubbing.

Audio production is typically handled using one or more computers running digital audio workstation software. However, in some cases a scene being produced can include hundreds or even thousands of audio tracks. Therefore, in order to handle large productions, conventional mixing studios are forced to construct complex hardware arrangements with multiple interlinked systems, including multiple hardware systems providing hardware based processing acceleration, which are linked to digital mixing consoles. This leads to very complex workflows, as well as high hardware costs.

Despite such systems being fully digital and software-based, most large scale audio post production systems today are still modelled on the conventions of their original analogue predecessors. This includes:

The notion of channel strips, with a rigid structure for signal flow.

The notion of hierarchical bussing, again with a rigid structure for signal flow.

The necessity to breakdown productions into linear chunks of tracks and stems (depth) and reels (time)

The Applicant's video editing system known as DaVinci Resolve® is an example of a modern video editing system that is extensively used in the professional environment. The functionality of DaVinci Resolve® can conveniently be divided into a number of separate functions/tasks that go into editing a video production. These functions are:

i) media management and clip organization;

ii) non-linear video editing;

iii) VFX design;

iv) color correction and grading;

v) sound editing/digital audio workstation functionality similar to that provided by stand-alone systems noted above; and vi) final rendering or output.

Other video editing software applications may include some or all of these functions, and some may include others functions.

The present inventor has determined that new systems and methods are needed to better suit the needs of modern audio production, particularly in the context of video editing, or at least alternatives to the existing systems and methods would be useful.

In the present specification, the words movie or video is not intended to be limited to moving images captured with a camera, but includes any other technique for generating video media, including but not limited to animation, film scanning, generating 2d or 3d images from a game engine, rendering engine, graphics engine or other visual development tool. Movies or video may or may not include one or more associated audio tracks, e.g., captured with or rendered for the images.

The systems, devices, methods and approaches described in this section, and components thereof are known to the inventor. Therefore, unless otherwise indicated, it should not be assumed that merely by virtue of their inclusion in this section any of such systems, devices, methods, approaches or their components described are:

citable as prior art;

ordinarily be known to a person of ordinary skill in the art;

form part of the common general knowledge in the art; or would be understood, regarded as relevant, and/or combined with other pieces of information by a skilled person in the art.

BRIEF SUMMARY

In a first aspect there is provided a method of a performing a plurality of processing operations on a plurality of audio entities using a computer system having multiple data processing units. The method may include:

allocating each data processing operation to one of said data processing units, such that said data processing operation is performed on said one of said data processing units; wherein said allocation is based at least partly on an expected execution time for the data processing operation on said one of said data processing units to which it is allocated;

performing said plurality of said audio processing operations on said plurality of audio entities according to said allocation; and outputting processed audio.

Allocating each data processing operation to one of said data processing units can further include determining dependencies between processing operations such that a processing operations that is dependent upon an output from another processing operation is performed after said another processing order.

Allocating each data processing operation to one of said data processing units can include identifying one or more realtime processing operations that must be performed in a predetermined time period, and prioritizing the performance of said realtime processing operations during allocation. Prioritizing the performance of said realtime processing operations may include allocating said realtime processing operations to be performed before non-realtime processing operations. Prioritizing the performance of said realtime processing operations may include allocating realtime processing operations such that they are to be performed on separate data processing units to non-realtime data processing operations.

In some embodiments, the method can include determining a revised allocation of each data processing operation to one of said data processing units. The revised allocation can be determined periodically, continuously, or in response to a re-allocation event.

In some embodiments, the method can include allocating some or each data processing operation to one of said data processing units according to said revised allocation. A some or each data processing operation to one of said data processing units according to said revised allocation could be performed either, or both of periodically, or in response a re-allocation event.

A re-allocation event could include any of the following events:

- the plurality of processing operations to be performed changes;
- the plurality of audio entities changes;
- an actual execution time of one or more processing operations on its allocated processing unit differs from a corresponding execution time by a predetermined amount;
- said plurality of said audio processing operations to be performed on said audio entities are not completed in a predetermined time period using a current allocation;
- it is determined that said plurality of said audio processing operations to be performed on said audio entities cannot be completed in a predetermined time period using a current allocation;
- an alternative allocation has been identified that improves overall processing time or efficiency by a predetermined amount;
- the number and/or permitted utilization of processing units in the computer system has changed.

The actual execution time of one or more processing operations on its allocated processing unit can be considered to differ from a corresponding execution time by a predetermined amount, in the event that an average actual execution time differs from the current expected execution time by a threshold amount.

In embodiments herein, the predetermined time period may be the duration of an audio slice being processed, or the duration of an audio slice being processed minus a safety margin.

Determining an expected execution time for a data processing operation on said one of said data processing units can include accessing an execution time database containing expected execution time data. The expected execution time data can include one or more of:

- standardized execution time data for a plurality of processing operations; and
- customized execution time data for a plurality of processing operations that indicate an expected execution time for processing operations on said computer system.

The method may further include:

- determining an actual execution time for a processing operation; and
- updating the customized time data.

In some embodiments, performing said plurality of said audio processing operations includes, upon completion of a preceding processing operation on an audio entity by a processing unit, signaling said completion to another processing unit to which a succeeding processing operation that is dependent upon the preceding processing operation has been allocated.

A further aspect of the present disclosure provides a method of performing a plurality of processing operations on a plurality of audio entities using a computer system having multiple data processing units.

The method may include:

- determining an expected execution time for a data processing operation on said one of said data processing units by accessing an execution time database containing expected execution time data;
- allocating each data processing operation to one of said data processing units, such that said data processing operation is performed on said one of said data processing units; wherein said allocation is based at least partly on an expected execution time for the data processing operation on said one of said data processing units to which it is allocated;
- performing said plurality of said audio processing operation on said plurality of audio entities according to said allocation;
- outputting processed audio;
- determining an actual execution time for at least one processing operation; and
- updating said execution time database.

In some embodiments, the execution time database may include at least customized execution time data for a plurality of processing operations that indicate an expected execution time for processing operations on said computer system. The method may include updating the customized time data for at least one processing operation using said determined actual execution time.

In some embodiments, the method may further comprise determining a revised allocation of each data processing operation to one of said data processing units using the updated execution time database.

In some embodiments, the method may include allocating some or each data processing operation to one of said data processing units according to said revised allocation; performing said plurality of said audio processing operation on said plurality of audio entities according to said revised allocation; and outputting processed audio.

In some embodiments, allocating each data processing operation to one of said data processing units may include identifying one or more realtime processing operations that must be performed in a predetermined time period, and prioritizing the performance of said realtime processing operations during allocation. Prioritizing the performance of said realtime processing operations may include one or more of allocating said realtime processing operations to be performed before non-realtime processing operations, and allocating realtime processing operations such that they are to be performed on separate data processing units to non-realtime data processing operations.

In a further aspect of the present disclosure, there is provided a method of a performing a plurality of processing operations on a plurality of audio entities using a computer system having multiple data processing units. The method may include:

- determining if each processing operation is a realtime processing operation that must be performed in a predetermined time period or non-realtime processing operation;
- allocating each realtime data processing operation to one of said data processing units, such that said realtime data processing operation is performed on said one of said data processing units within the predetermined time period; wherein said allocation is based at least partly on an expected execution time for the realtime data processing operation on said one of said data processing units to which it is allocated;

- allocating each non-realtime data processing operation to one of said data processing units, such that said non-realtime data processing operation is performed on said one of said data processing units; wherein said allocation is based at least partly on an expected execution time for the non-realtime data processing operation on said one of said data processing units to which it is allocated;
- performing said plurality of said audio processing operation on said plurality of audio entities according to said allocation; and
- outputting processed audio.

In some embodiments, the method may include allocating said realtime processing operations before the allocation of non-realtime processing operations.

In some embodiments, the method may include allocating realtime processing operations such that they are to be performed on separate data processing units to non-realtime data processing operations.

In some embodiments, a non-realtime processing operation may be performed in a time period twice as long as the predetermined time period.

In some embodiments, the method may include the multiple data processing units may include one or more data processing units that are high speed processing units, and one or more data processing units that are low speed processing units. The method may comprise preferentially allocating realtime processing operations to said high speed data processing units.

In some embodiments, the method may include at least the expected execution time for the realtime data processing operation is stored in an execution time database. The expected execution time for the non-realtime data processing operations may additionally be stored in said execution time database.

The method may include determining an actual execution time for at least one realtime data processing operation and updating said execution time database.

The method may include determining an actual execution time for at least one non-realtime data processing operation and updating said execution time database.

In some embodiments, the method may include determining a revised allocation of at least each realtime data processing operation to one of said data processing units using the updated execution time database. In some embodiments, the method may include determining a revised allocation of at least some non-realtime data processing operations to one of said data processing units using the updated execution time database.

In some embodiments, the method may include allocating some or each realtime data processing operation to one of said data processing units according to said revised allocation; performing said plurality of said audio processing operation on said plurality of audio entities according to said revised allocation; and outputting processed audio. In some embodiments, the method may also include allocating some or each non-realtime data processing operation to one of said data processing units according to said revised allocation.

In another aspect, the present disclosure provides a method of a performing a plurality of processing operations on a plurality of audio entities using a computer system having multiple data processing units. The method may include:

- allocating each data processing operation to one of said data processing units, such that said data processing operation is performed on said one of said data processing units; wherein said allocation is based at least partly on an expected execution time for the data processing operation on said one of said data processing units to which it is allocated;
- performing said plurality of said audio processing operation on said plurality of audio entities according to said allocation;
- outputting processed audio; and
- determining a revised allocation of each data processing operation to one of said data processing units.

In some embodiments, said revised allocation may be determined, one or more of: periodically, continuously, or in response to a re-allocation event.

In some embodiments, the method may include allocating some or each data processing operation to one of said data processing units according to said revised allocation; performing said plurality of said audio processing operation on said plurality of audio entities according to said revised allocation; and outputting processed audio.

In some embodiments, allocating some or each data processing operation to one of said data processing units according to said revised allocation may be performed either or both of periodically or in response to a re-allocation event.

For example, a re-allocation event may be any one of the following events:

- the plurality of processing operations to be performed changes;
- the plurality of audio entities changes;
- an actual execution time of one or more processing operations on its allocated processing unit differs from a corresponding execution time by a predetermined amount;
- said plurality of said audio processing operations to be performed on said audio entities are not completed in a predetermined time period using a current allocation;
- it is determined that said plurality of said audio processing operations to be performed on said audio entities cannot be completed in a predetermined time period using a current allocation;
- an alternative allocation has been identified that improves overall processing time or efficiency by a predetermined amount;
- the number and/or permitted utilization of processing units in the computer system has changed.

In another aspect, the present disclosure provides a method of processing a plurality of audio entities using a computer system having multiple data processing units.

The method may include:

- performing a plurality of audio processing operations on said plurality of audio entities according to a predetermined allocation, said predetermined allocation defining which data processing unit is to perform each data processing operation on each audio entity;
- outputting processed audio;
- determining an actual execution time for at least one processing operation performed on one audio entity by one data processing unit;
- updating an execution time database to include said actual execution time; and
- determining a revised allocation of each data processing operation to one of said data processing units using the updated execution time database, wherein said revised allocation is based at least partly on an expected execution time for the data processing operation on said one of said data processing units to which it is allocated.

In some embodiments, said revised allocation may be determined, one or more of periodically, continuously, in response to a re-allocation event.

In some embodiments, the method may include allocating some or each data processing operation to one of said data processing units according to said revised allocation; performing a plurality of audio processing operations on said plurality of audio entities according to revised allocation; and outputting processed audio.

Allocating some or each data processing operation to one of said data processing units according to said revised allocation is performed either, or both of periodically, or in response a re-allocation event.

In a further aspect, an audio processing system is disclosed. The audio processing system includes multiple data processing units, said audio processing system being configured to perform processing operations on a plurality of audio entities, wherein each audio entity has at least one data processing operation performed on it, the audio processing system including a control unit arranged to allocate each data processing operation to one of said data processing units, such that said data processing operation is performed on said one of said data processing units; wherein the control unit performs said allocation at least partly on the basis of an expected execution time for the data processing operation on said one of said data processing units to which it is allocated.

The control unit may be further arranged to cause the audio processing system to perform a method according to an embodiment of any of the foregoing aspects of the disclosure.

The control unit may be arranged to determine dependencies between processing operations such that a processing operation that is dependent upon an output from another processing operation is performed after said another processing order.

The control unit may be arranged to identify one or more realtime processing operations that must be performed in a predetermined time period, and prioritize the performance of said realtime processing operations during allocation.

The control unit may allocate said realtime processing operations to processing units such that said realtime processing units are performed before non-realtime processing operations.

The control unit may be may generate a revised allocation of each data processing operation to one of said data processing units.

The control unit may allocate some or each data processing operation to one of said data processing units according to said revised allocation either, or both of periodically, or in response a re-allocation event.

A re-allocation event may be any one of the following events:

- the plurality of processing operations to be performed changes;
- the plurality of audio entities changes;
- an actual execution time of one or more processing operations on its allocated processing unit differs from a corresponding execution time by a predetermined amount;
- said plurality of said audio processing operations to be performed on said audio entities are not completed in a predetermined time period using a current allocation;
- it is determined that said plurality of said audio processing operations to be performed on said audio entities cannot be completed in a predetermined time period using a current allocation;
- an alternative allocation has been identified that improves overall processing time or efficiency by a predetermined amount;
- the number and/or permitted utilization of processing units in the computer system has changed.

Embodiments may further include an execution time databased containing expected execution time data.

Embodiments may further include an execution monitoring component configured to determine an actual execution time for a processing operation, and update the execution time database.

In some embodiments, a processing unit that performs a preceding processing operation on an audio entity, signals completion of the preceding processing operation to another processing unit to a which a succeeding processing operation, that is dependent upon the preceding processing operation, has been allocated.

In a further aspect, there is provided a non-transitory computer readable medium configured to carry instructions, which when executed by a computer system, cause the computer system to perform a method as described in any example herein. The instructions may implement digital audio workstation software. The instructions may implement audio processing functions in video editing software, e.g., a non-linear editor.

In the present specification, an audio entity may comprise any one of: An audio track; An audio bus; An audio file; or A stem.

In the present specification, an audio bus can comprise a plurality of audio tracks, stems or busses, or a combination thereof, which are combined into a single audio entity.

In the present specification, a data processing unit can include any one or more of a computer processor, a computer processor core, a sound processor, an FPGA, or a hardware acceleration card.

In the present specification examples of processing operations include:

- reading or writing an audio entity from memory, including operations such as audio entity playback (e.g., track playback), audio entity recording (e.g., track recording), black-box recording.
- level control including operations such as Input trim, output level, phase control.
- mixing, including operations such as, single in-line mixing, multi-tier sub mixing with combiner for larger mixes, mono and multi-format mixing of audio elements, panning signals in 0, 1, 2 and 3 planes, mixing in track-to-bus, bus-to-bus, and bus to speaker scenarios.
- audio Metering and analysis; including for measurements such as Sample PPM, True Peak, RMS, Loudness, Spectrum, Phase;
- third party audio plug-in processing;
- tonal Control, including operations such as, Static and Dynamic Audio Equalization, and Static and Dynamic Audio Filtering, distortion generators;
- dynamics processing; including use of tools such as an Expander, single and multiband compressor, limiter;
- time and pitch processing, including operations such as, Pitch change, pitch correction;
- audio signal generation and synthesis, including generating the following, Mono and stereo sinewaves, White and Pink noise, time code;
- restoration operations such as, noise reduction, De-essing, De-humming, stereo width control;
- audio device emulation and simulation of devices such as an Optical Compressor;

audio element categorization including to indicate Dialog vs non-dialog and other characteristics, tagging or meta data updating;

time-based balancing of audio signal phase; including to compensate for delays in external signal paths; to compensate for delays in internal processing, to facilitate look-ahead;

spatial enhancers, such as Delay, Echo, Reverb, flanger, chorus, modulator;

integration of internal and third party audio rendering technologies; and audio I/O management including operations such as: handling of asynchronous input and output environments (e.g., 44K1 in, 48K out); handling of semi-synchronous input and output environments (e.g., 48K in, 48K out), application of dither, application of catch-all limiting.

While the aspect(s) disclosed herein are amenable to various modifications and alternative forms, specific embodiments are shown by way of example in the drawings and are described in detail. It should be understood, however, that the drawings and detailed description are not intended to limit the disclosure(s) to the particular form disclosed. Furthermore, all alternative combinations of two or more of the individual features mentioned or evident from the text or drawings comprise additional aspects or inventive disclosures, which may form the subject of claims.

BRIEF DESCRIPTION OF THE DRAWINGS

FIG. 2 is a schematic diagram illustrating the processing of audio by a computer system with a single processing unit.

FIG. 3 is a schematic diagram illustrating the execution of plurality of processing operations on a plurality of audio entities using a computer system with multiple processing units.

FIG. 4 is a schematic diagram illustrating the execution of plurality of processing operations on a plurality of audio entities using a computer system with multiple processing units.

FIG. 6 illustrates a table representing an execution time database.

FIG. 8 illustrates a set of processing operations to be performed on a series of 38 audio entities.

FIG. 9 illustrates an exemplary allocation of the processing operations of FIG. 8 to processing units.

FIG. 10 is a schematic diagram illustrating the execution of plurality of processing operations on a plurality of audio entities using a computer system with multiple processing units.

DETAILED DESCRIPTION

Figure 1:
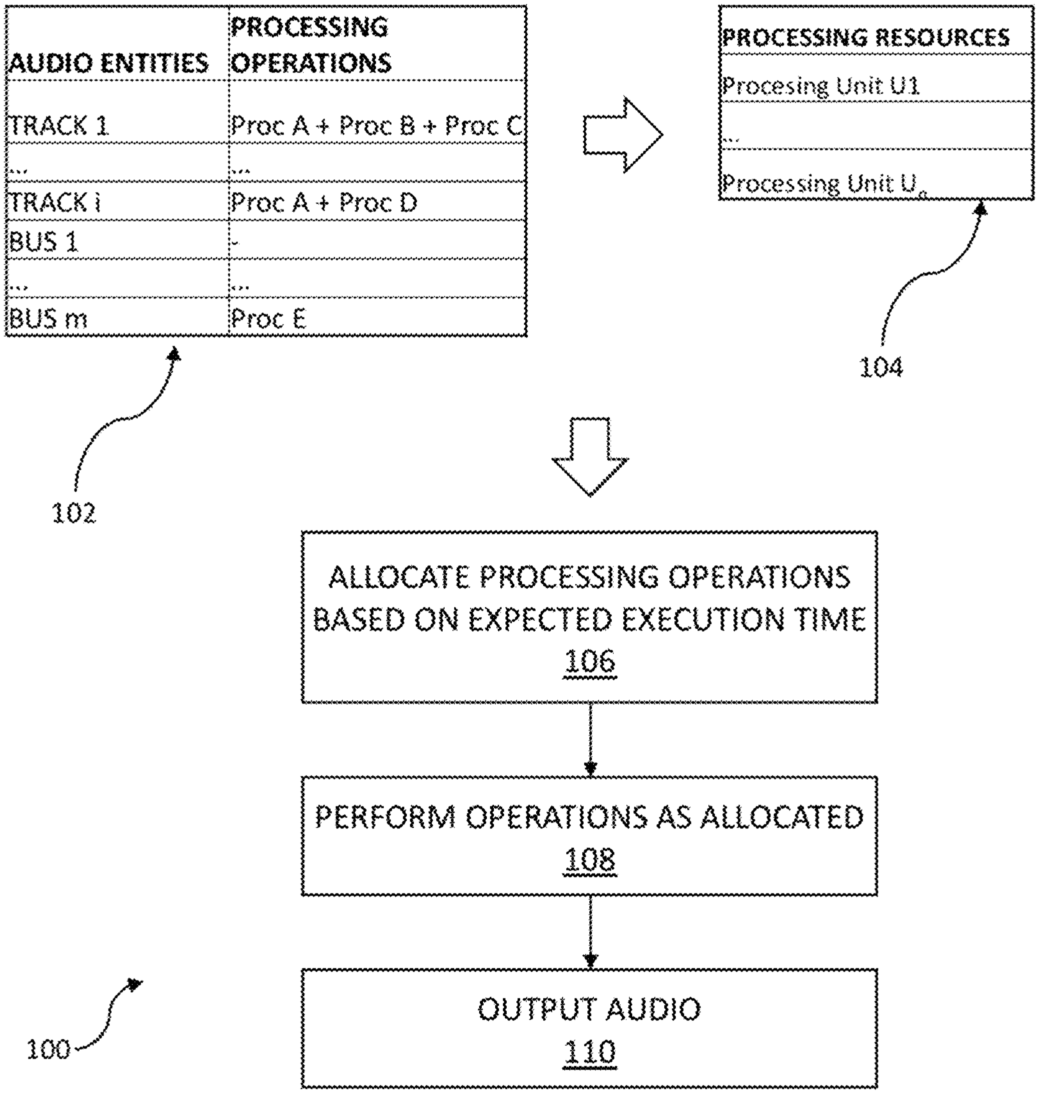
FIG. 1 is a flowchart showing an overview of a method according to the disclosure.

In the following description, numerous specific details are set forth in order to provide a thorough understanding of the present disclosure. It will be apparent, however, that the present disclosure may be practiced without these specific details. In some instances, well-known structures and devices are shown in block diagram form in order to avoid unnecessary obfuscation of salient details.

As will be appreciated, the method is performed in a digital environment so the audio entities are made up of samples having a particular sampling rate. Such audio is typically stored in a data storage system (either local or remote) and then loaded into memory prior to processing. Usually digital audio will be processed in blocks of samples, the size of which is usually dependent on the hardware capabilities of the computer system performing the processing. For example, blocks will typically range in size from 32 to 512 samples, but may be longer or shorter. The processing of data in blocks means that latency is introduced into the audio processing as all of the audio samples of a block need to be read then processed together prior to output. This introduces a critical time element into the processing of the audio stream insofar as it is necessary to have a continuous output, so all processing of a block must be completed before output of the previous block has concluded. For example, if the audio is recorded with a sample rate of 48 kHz and a block contains 512 samples this represents a time slice of approximately 10.6 milliseconds. This necessarily means that all processing operations on the next 512 samples of each audio entity must be completed within 10.6 milliseconds so that a continuous output can be generated. On average this means that each sample must be processed within 20.8 microseconds. Latency can be reduced by making the processing block smaller. But there are trade-offs in doing so because more blocks need to be processed. For example, processing overhead increases (e.g., there is more switching between tasks such as reads and writes from memory, etc.), and the risk of failing to complete processing within a time slice increases.

Accordingly the description of the present embodiment will assume a block size of 512 samples of audio at 48 kHz sample rate, meaning a time slice is approximately 10.6 ms, although this should not be considered to be limiting on the present disclosure. Also, in preparation for processing a given audio entity, several blocks of data to be processed in the future will first be loaded into a track cache buffer prior to processing according to the present disclosure.

FIG. 1 is a flowchart illustrating an overview of a method according to the present disclosure. The method 100 requires the performance of a plurality of processing operations on a plurality of audio entities using a computer system such as the computer system 1000 of FIG. 12. The list of audio entities to be processed and the respective processing operations to be performed on each is illustrated in table 102. The processing resources available to the computer system 1000 are listed in table 104. The processing resources include a plurality of independently operable data processing units, for example this can be: multiple computer processors, a multiple computer processor cores (in one or more processors, GPUs, etc.), sound processors, FPGAs, GPUs (or cores thereof), hardware acceleration cards.

As noted above, the audio being processed may include a large number of audio entities. The audio entities can include audio tracks, audio files, audio buses, stems or other entity encoding audio data. In some cases, the plurality of audio entities will include a mixture of types of audio entitles. An audio bus can be defined by the combination of other audio entities such as files, tracks, stems or even other buses.

The method 100 includes, at step 106, allocating each data processing operation to one of the data processing units. This allocation is based, at least partly, on an expected execution time for the data processing operation on the processing unit to which it is allocated. After allocation is performed in step 106, the processing units perform their allocated processing operations on the relevant audio entity and processed audio is output. Output can include being output for playback by speakers or the like, writing a processed audio file to a data storage device or other output event. Step 108 is performed on a block by block basis on the necessary audio entities until the whole audio processing sequence is completed.

Typically each audio entity will have at least one data processing operation performed on it during a time slice. In some embodiments even when a given track has no audio output or is otherwise inactive in a given time slice (e.g., a track has zero volume, or a track is not in use) the audio entity will still be processed. This situation is one reason why audio processing associated with movies is a significant technical challenge. Even though a particular sound might only be used for a few seconds of the movie, the audio entity associated with it will may still be processed throughout the whole production. This is a factor in the accumulation of such large numbers of audio entities to be processed. However, in some embodiments, audio entities that are inactive during a time slice may be treated with a lower priority than active audio entities, or potentially excluded from processing during a given time slice in order to minimize processing load.

Allocation of Processing Operations

FIG. 2 is a schematic diagram of a mechanism for performing a plurality of processing operations on a plurality of audio entities using a computer system, and is useful for setting the context for the task of allocation of processing operations to processing units. In this embodiment, the computer system has a single data processing unit in the form of a computer processor with a single processing core. The audio entities to be processed in this example are four audio tracks (tracks 1 to 4) and one bus (Bus 1). Bus 1 is formed by combining Tracks 1 to 4.

The single core of the computer system is controlled by software to perform audio processing as follows. The order of processing progresses downward, as indicated by increasing time units in the second column. However, it should be noted that the time periods indicated in FIG. 2 (and FIGS. 3, 4 and 10 below) do not represent any real world time period, but are intended to merely reflect a time sequence of events. Therefore, time period N may be longer than time period M, and a processing operation performed by a processing unit may take longer than the time period in which it has been nominally been indicated. FIG. 2 illustrates all processing operations on the four audio entities that must take place within a time slice.

The first processing operation performed is playback of Track 1, i.e., reading track 1 from the track cache buffer or other memory. Track 1 is then processed in time period 2 by application of a second processing operation. Track 1 is subsequently added to Bus 1 (which typically involves writing Track 1 to a suitable buffer or memory location).

The next processing operation performed (in time period 4) is playback of Track 2. Track 2 is then processed in time period 5 in a second processing operation. Track 2 is then added to Bus 1. This process continues with Tracks 3 and 4. Track 3 is played back from the track cache buffer in time period 7. Track 3 is then processed in time period 8 in a second processing operation applicable to it. Track 3 is then added to Bus 1. Track 4 is played back from the track cache buffer in time period 10. Track 4 is then processed in time period 11 in a second processing operation applicable to it. Track 4 is then added to Bus 1.

Next (in time period 13) the Bus (which is now the relevant audio entity—instead of individual tracks) is processed according to a processing operation. It is then read into an output buffer as the final processing operation on Bus 1. The output is now ready for final rendering, e.g., audio playback or writing to a file for storage. The processing operations performed on each track in this example may be the same as that performed on one or more of the other tracks, or different to one or more of the processing operations performed on the other tracks, or they may have different parameters applied by a user to the tracks.

In this example, since there is a single processing unit, the order in which the processing operations are performed is not critical except that dependency of processing operations must be observed. That is, a processing operation (and succeeding processing operations) that is dependent on the output of (at least) another processing operation (a preceding processing operation) must be performed on the audio entity after the completion of the preceding processing operation. For example, the "Track 1 processing" (time period 2) operation must occur after "Track 1 playback" (time period 2) as the track must be available prior to other processing occurring. Also the "Bus 1 Processing" must occur after all tracks comprising Bus 1 are added to the bus. However, there is no dependency between the processing of Track 1 and the processing of any of the other tracks. So the Track 4 processing steps may all occur before the track 1 processing steps, or be interleaved with them, so long as those processing operations applicable to each Track which have a dependency on a preceding processing operation occur first. As will be seen in connection with FIGS. 3 and 4, the "Add Track X to Bus 1" operations display a second type of dependency, namely that these processing operations must be performed in the same processing unit as each other.

FIG. 3 illustrates processing of the same group of audio entities by the same processing operations as FIG. 2. However, in FIG. 3 the computer system has multiple data processing units. In this case, the computer system has multiple processing units in the form of four processor cores in a quad-core microprocessor chip. The four left-most columns of FIG. 3 illustrate which processing operations are performed by each core. As with FIG. 2, the time period in which each processing operation takes place is indicated in the right hand column. The entire set of illustrated processing operations need to be performed on the block of samples in a given time slice.

Because the quad-core processor of FIG. 3 can perform operations is parallel, the audio entities can be processed as follows:

In the first time period, "Playback" of Track 1 is performed by Core 1; "Playback" of Track 2 is performed by Core 2, "Playback" of Track 3 is performed by Core 3, and "Playback" of Track 4 is performed by Core 4. These processing operations occur in parallel. Next, in the second time period "Track 1 Processing" is performed by Core 1, "Track 2 Processing" is performed by Core 2, "Track 3 Processing" is performed by Core 3 and "Track 4 Processing" is performed by Core 4. Note that the "Track X Processing" steps are dependent upon the performance of the "Track X Playback" step concluding and thus are performed after conclusion of the corresponding playback step.

Next, in time periods 3 to 6, Core 4 is allocated the processing operations of adding each track to Bus 1. These processing operations are dependent on each other in the sense that they need to be performed by the same processing unit. However, these steps are performed in numerical order of the track number for convenience, but need not be. And as will be explained below, it may be advantageous to perform execution of these processing operations in a different order. Next, in time period 7, Core 4 executes the Bus 1 Processing operation on the contents of Bus 1. Core 4 then performs the processing operation "Bus 1 Output" in time period 8 and the output is ready for downstream use. As would be expected, using multiple cores in parallel results in faster processing than the equivalent processing operations performed on a single processing unit having otherwise equivalent performance.

Embodiments of the disclosure provide a method of a performing a plurality of processing operations on a plurality of audio entities using a computer system having multiple data processing units, such as the quad core system of FIG. 3. FIG. 3 represents an allocation of tasks that simply takes advantage of the parallel processing ability of a computing system having multiple data processing units. However, the allocation process can be extended in embodiments of the present disclosure to perform the allocation based at least partly on an expected execution time for the data processing operation on the data processing unit to which it is allocated. This allocation process can improve execution time when multiple audio processing operations are to be performed, or at least ensure a greater margin for error is allowed in order to improve the likelihood that the necessary processing of a sample block is performed within its allocated time slice.

A simple example can be discussed in relation to FIG. 4. FIG. 4 represents the operation of the same computer system as FIG. 3, processing the same audio entities using the same processing operations. However, in this example the time periods in the right column represent unit time periods. Moreover the height (in the time direction) of each processing operation corresponds to the expected execution time needed to perform each processing operation. In this example, each "Playback" step is expected to take the same time to execute, but the "Track X Processing" operations are expected to take different times due to their relative complexity. In this regard "Track 1 Processing", "Track 2 Processing", and "Track 3 Processing" are expected to take twice as long as "Track 4 Processing". Accordingly, based on the expected short duration of the "Track 4 Processing" operation, Core 4, to which "Track 4 Processing" has been allocated is also allocated the dependent processing operations of Adding the tracks to Bus 1 and processing Bus 1. In this way, the overall execution time of the plurality of processing operations is reduced compared to some other possible allocations.

It will also be noted that FIG. 4 differs from FIG. 3 in that the first track that is added to Bus 1 is Track 4. In time period 3, the processing operation "Add Track 4 to Bus 1" is performed. This can be performed at this time because "Track 4 Processing" is expected to be completed by the start of time period 3. In contrast, in FIG. 3 Track 1 is the first track added to Bus 1. However, when the expected execution time is taken into account when allocating processing operations to processing units, it can be seen that such an order of execution would force Core 4 to wait until completion of the "Track 1 Processing" operation by Core 1 before Track 1 could be added to Bus 1, and hence the overall execution time of the series of operations would be extended. Since the "Add track X to Bus 1" operations must be performed by the same processing unit but there is no dependency with regard to the order in which the operations can be performed these processing operations are allocated in an order that reduces expected execution time overall.

In order to avoid a risk that a preceding processing operation is not competed before a dependent processing operation begins, the allocation process can include a safety margin. This can be done by adding a safety margin of a particular duration to the expected completion time of each processing operation. For example, a safety margin of 0.4 microseconds may be added to account for variations in switching time, variation in actual execution time, or other delays. Either instead or in addition to this, the computer system according to an embodiment may employ signaling between processing units to indicate completion of a preceding operation. For example, in FIG. 4, intercore signaling from Core 2 to Core 4 is used to tell Core 4 that the "Track 2 Processing" operation has completed, before Core 4 attempts to add Track 2 to Bus 1. Such intercore signaling can also be used to indicate the completion of "Track 1 processing" and "Track 3 Processing". This safety margin can either be a static value, or can be part of the updating 306 and monitoring 410 process discussed in connection with FIG. 11.

Figure 5:
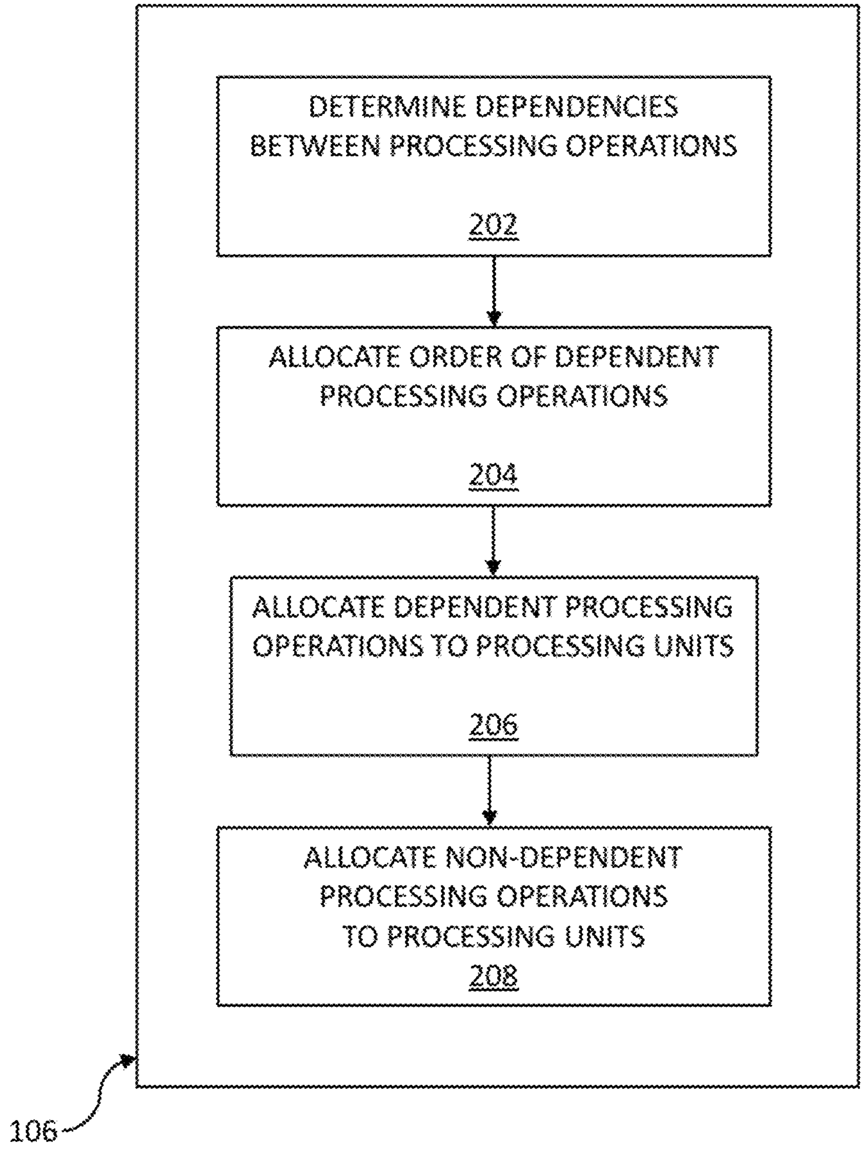
FIG. 5 is a flowchart of a process for allocating processing operations to a plurality of processing units.

FIG. 5 is a flowchart of a process that can be used in process 106 to perform allocation of processing operations. The process includes at 202 determining if any dependencies exist between processing operations, and if they do, at step 204 the relevant processing operations can be ordered or grouped accordingly. Next, the dependent and other (non-dependent) processing operations (at 206 and 208) are allocated to processing units based on their expected execution time.

In order to allocate each data processing operation to one of said data processing units, in a way that takes the expected execution time for the data processing operation into account it is necessary for the computer system to have an estimate of the execution time of each processing operation. This can be achieved by having an execution time database containing expected execution time data for each data processing operation. The execution timing database can take several forms.

In a simplest form, the execution timing database can include standardized execution time data for processing operations. This may include a standard expected execution time for each processing operation type, or class of processing operations. These standard expected execution data may be tailored to the hardware configuration of the computer system being used, or be generic in the sense that they are not-system specific. Such standardized execution time data can be provided by the computer system or software supplier, based on empirical testing of representative systems or theoretical estimates. The expected execution time data (whether standardized or customized) can include one or more of: a minimum execution time, maximum execution time, average execution time or other useful indication of execution time.

In an alternative form, the execution time data may be customized execution time data. Said customized execution time data can be generated by monitoring the actual performance of the computer system processing the audio data. Alternatively, they may be generated based on testing of the computer system, e.g., using test audio entities and test processing operations.

A hybrid system can be used, whereby the execution time database either contains both standardized execution time data and customized execution time data, or which uses standardized execution time data as a baseline and updates it over time to reflect the computer system performance such that it becomes customized execution time data.

FIG. 6 illustrates a table representing an execution time database. It represents the expected execution time for nine processing operations P1 to P7 when performed on each of twelve Processing Units U1 to U12. As can be seen, each processing unit has its own separate expected execution time to perform each processing operation. Processing Unit U4 is on average the fastest processing unit and U11 is typically the slowest. The processing operation P6 is expected to take significantly longer than all other operations, with P1 being consistently having the shortest execution time. The time in this diagram is expressed in "time units" and thus are illustrative only and should not be expected to reflect the actual execution time of any particular processing operation on any particular computer system. As noted above, such an execution time database may be standardized or customized. However, one would expect a standardized execution time database to be more straightforward in that each process might be given the same estimated time for each processing unit (unless certain processing units are known to operate faster or slower than the others). In this regard, a standardized execution time database may provide a uniform estimated execution time of 1.2 for P1 to P3 for all processing units, 1.3 for P3.2, P3.3 and P7 for all processing units, 2.4 for P4 and P5 for all processing units, and 4.6 for P5 for all processing units. If the table of FIG. 6 represents a typical computer system performance, the exemplary standardized data presented above is a "safe" set of data, insofar as for all operations the expected execution time is longer than the longest actual execution time for each process in the customized execution time data. Using such standardized execution time data assists in performing allocations that can execute reliably within the designated time slice.

Figure 7:
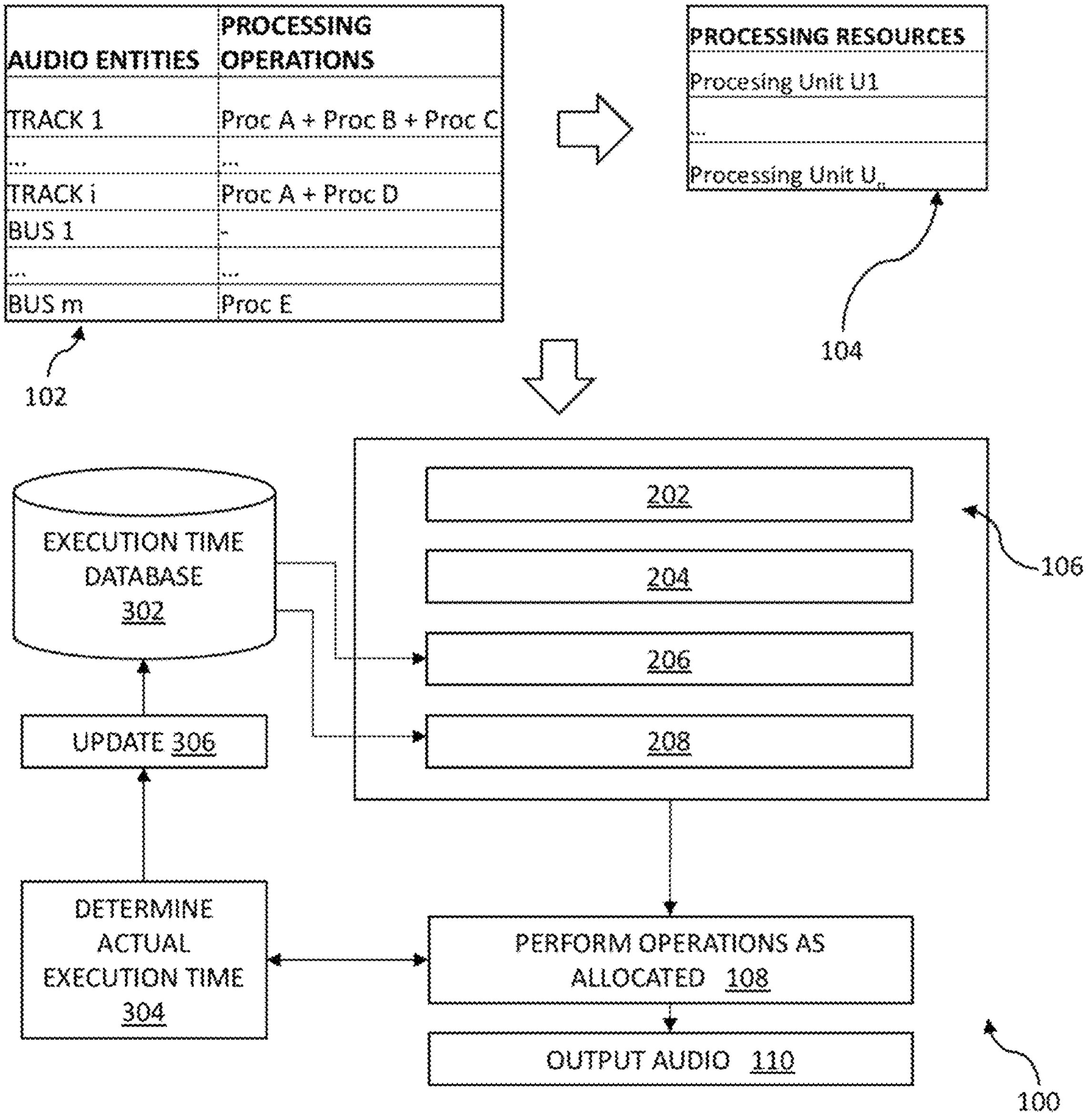
FIG. 7 illustrates a process for creating or updating a customized execution time database.

FIG. 7 illustrates a process for creating or updating a customized execution time database. FIG. 7 illustrates an expanded flowchart of FIG. 1, which additionally illustrates the execution time database 302. The process 100 operates broadly in accordance with FIG. 1 and FIG. 5, but includes determining at step 304 an actual execution time of a processing operation during execution (i.e., in step 108). The actual execution time data that is gathered is used to update the execution time database 302 in step 306. Updating the database can take many forms, it may include adding the gathered actual execution time for each operation to the database 302, directly generating an updated expected execution time of a particular processing operation in the execution time database 302 (rather than storing the raw execution data), or both. In this way the execution time database 302 can be kept up to date when steps 206 and 208 are performed within process 106. In some embodiments, a customized execution time database can additionally track the context in which an of operation is performed as well as execution time for a given operation. This allows the execution time database to capture context specific execution time data. That is, the execution time data can reflect how long a processing operation takes to execute on a given processing unit in the context of the state of the computer system at the time of execution. For example, the context may track:

- what operations preceded it in order to account for performance of a specific processing unit's cache and memory performance;
- other processes being executed in the same slice;
- other operational parameters of the computer system, e.g., if the computer system is a laptop or other battery powered device the context may be whether the device is operating on battery power or mains power, etc.

FIG. 8 illustrates a series of 38 audio entities and a corresponding set of processing operations to be applied to each. The processing operations are those set out in the execution time database of FIG. 6. As can be seen, each audio entity has its own set of processing operations that are not dependent on their neighbors. The order of processing operations for each audio entity does not necessarily reflect dependency of one processing operation on a preceding processing operation. However, operation P2, which is performed on all audio entities, is dependent on all processing operations. That is, it can only be completed once all other operations have been performed.

This series of processing operations can be allocated to the 12 processing units as illustrated in FIG. 9 using the allocation scheme of an embodiment of the disclosure. As illustrated in FIG. 5, at step 202 the computer system determines dependencies between processing operations for each audio entity. As noted above operation P2, which is performed on all audio entities is dependent on all processing operations, so must come last in the order of processing of each audio entity. Next steps 206 and 208 are performed by reference to the execution time database 302 to allocate the processing operations to the 12 available processor units. The output of the allocation is shown in FIG. 9. As can be seen, the longest series of processing is expected to take 8.276 time units to perform on processing unit 4. All other allocations to the processors take less than this time.

The allocation scheme used is able to be tuned to accommodate many trade-offs in addition to pure speed, for example allocations may be made to minimize the need to signal between processing units or to avoid the need to add additional safety margins between operations in a situation where the output of one processor needs to be completed before another processor can perform a function. In the example of FIG. 9, all processing for a given audio entity is performed by the same processing unit so no signaling between processors units is needed. The longest processing time on Processing unit 4 represents the processing that is performed on audio entity 36. This strategy also reduces overhead spent in switching processing of an audio entity between processing units.

FIG. 10 illustrates a further adaptation of the allocation process that can be made in some embodiments. The example of FIG. 10 shows an allocation of the same processing operations as FIGS. 2 to 4 over two successive time slices at time t−1 and time t. The allocation differs to that of FIG. 4 in that a distinction is drawn between processing operations that must be prioritized and those that need not. For example, some processing operations do not contribute to the audio output, or if delayed, will not cause a material change in the audio output, and thus need not strictly be performed within the current time slice. These include for example, processing operations on inactive audio entities, or a modification to an of output level of an audio entity. It may not be immediately apparent that delaying a modification in an output level is relatively inconsequential, however a delay by one slice in such a modification will typically be unnoticeable to a listener, or at least not problematic. If an audio entity has its output level reduced to half its previous volume over a 1 second period, a 10 ms delay in this change will be insignificant.

Accordingly, the allocation process used in some embodiments can make a distinction between realtime processing operations that must be processed within a time slice, and non-realtime processing operations, such as neartime processing operations which can be delayed by one slice. During allocation of processing operations to processor units, realtime processing operations are preferably prioritized. For example, they may be performed earlier in the time slice, or performed on processors which offer shorter expected execution times. In some cases the realtime processing operations are performed on one group of processing units while neartime tasks are processed on different processing units. The division may be made based on the speed of the processing units, such as if a computer system has high speed and low speed cores or processors, the highspeed cores or processors can be used of the highest priority (i.e., realtime) processing operations, while the other operations are performed on the slower processors or cores.

FIG. 10 implements such a system in that Cores 2 to 4 are used to perform tasks considered to be realtime tasks in that they must be concluded within the current slice, but Core 1 includes less time sensitive processing operations. Because the neartime processing operations allocated to Core 1 can be delayed by 1 time slice, it is possible to exploit this permissible delay to minimize overall processing time. In this regard, the neartime processing operations can be run one time slice later than their corresponding realtime tasks. This means that within the time slice "t−1" illustrated at the top of FIG. 10, Core 1 can process data output by the realtime processing stages from the preceding time slice (t−2), while cores 2-4 are processing current time slice (t−1) samples. This means that there is no need for Core 1 to wait for Cores 2 to 4 to complete their operations within this slice before beginning its processing operations, because core 1 uses input data from the preceding time slice (t−2). In the bottom slice (t) Core 1 performs the neartime processing operations on the data from time slice (t−1), while the realtime processing operations on cores 2 to 4 process samples from time slice (t).

Revised Allocation of Processing Operations

Figure 11:
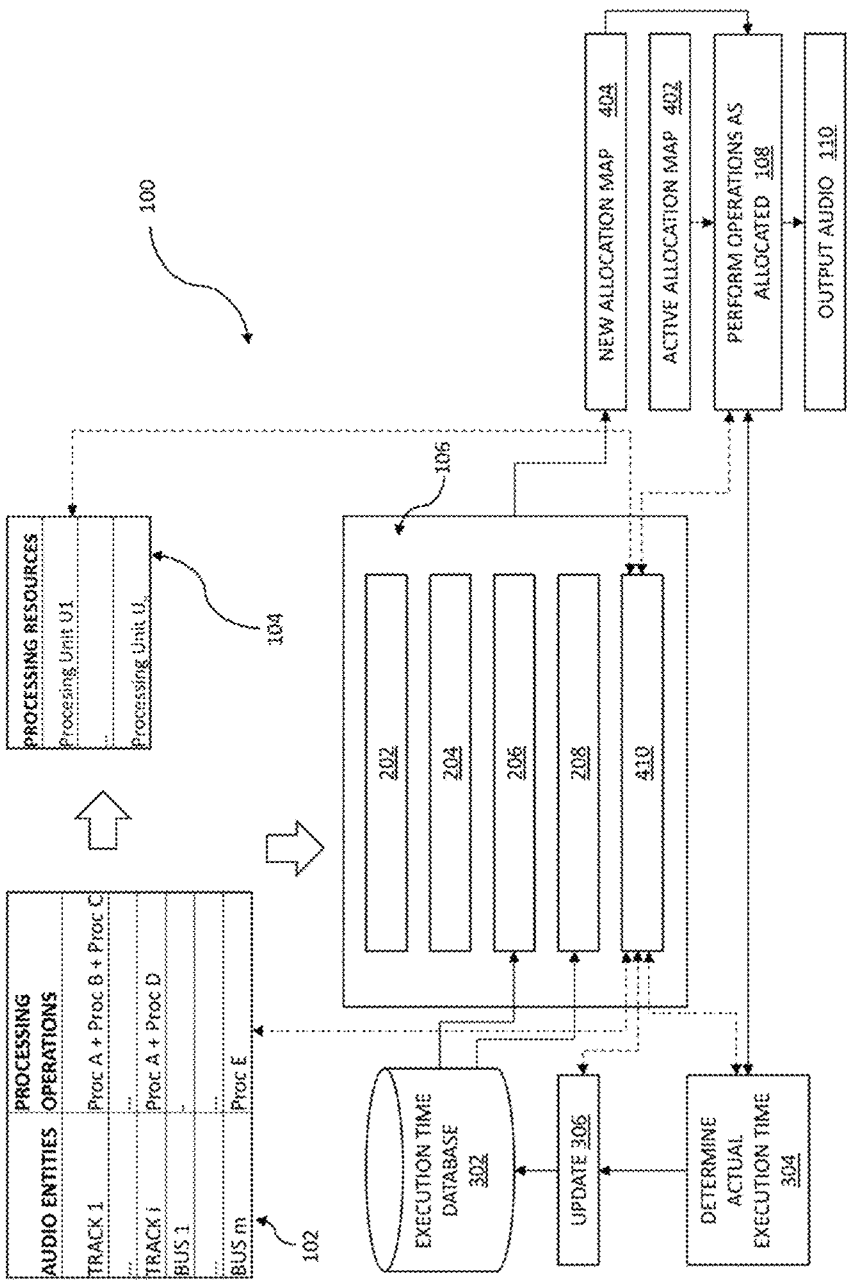
FIG. 11 shows a further flowchart based on FIG. 1, showing an expanded allocation process.

FIG. 11 shows a further flowchart based on FIG. 1, showing an expanded process 100 to illustrate a mechanism for updating the allocation of processing operations to processing units. In this example, the computer system monitors operation 410 of the current allocation and causes it to be updated or replaced if needed. The allocation that applies to a current time slice is labelled "Active allocation map 402" and is used as described above. However, in this embodiment, a second allocation map 404 is generated and stored. The second allocation map 404 is generated using the same process as the current allocation map, however if using a customized execution time database, it can be generated with the benefit of the most up-to-date execution time data and also account for any other changes that needed to be taken into account. The generation of the new allocation map 404 may be performed continuously in some embodiments. In other embodiments, it may be generated periodically or whenever sufficient system resources are available to do so. Further, the generation of the new allocation map (i.e., re-allocation) is performed in response to a detected re-allocation event by the monitoring process 410. Generation of the new allocation map can be independent from the activation of that activation map such that a new allocation map 404 may have been generated but it may not be used. In some cases, the new allocation map 404 is substituted for the active allocation map at the conclusion of processing of the current time slice, however in other embodiments the new allocation map is applied only in response to a re-allocation event, or swapped for the current allocation map periodically. Dotted lines in FIG. 11 illustrate monitoring that may be performed to detect occurrence of re-allocation events that may trigger either or both of re-allocation of processing operations (i.e., generation of an allocation map) and activation of the new allocation map to enable performance of the processing operations in response to the re-allocation. For example, a re-allocation event could be any one of the following, to name some possibilities:

- A change to the plurality of processing operations to be performed.
- A change to the plurality of audio entities (e.g., tracks, or busses are added or removed, or tracks are added or removed from one or more busses, etc.)
- The actual execution time of one or more processing operations on its allocated processing unit differs from a corresponding expected execution time by a predetermined amount, e.g., a certain percentage, such as 5%, 10%, 20%, 50% or other amount.
- One or more of the audio processing operations to be performed in the time slice are not completed in the predetermined time period. This criterion may apply only to realtime processing operations, or may additionally apply (possibly with modification) to neartime processing operations.
- It may be estimated that the plurality of said audio processing operations would not be completed in the time slice using the current allocation, based on the expected execution time for each processing operation.
- An alternative allocation has been generated that improves overall processing time or efficiency by a predetermined amount, or at least provides a greater safety margin compared to the current active application.
- A change occurs to the number of processing units available and/or the permitted level of utilization of the processing units for audio processing in the computer system.

Any definitions expressly provided herein for terms contained in the appended claims shall govern the meaning of those terms as used in the claims. No limitation, element, property, feature, advantage or attribute that is not expressly recited in a claim should limit the scope of the claim in any way.

As used herein, the terms "include" and "comprise" (and variations of those terms, such as "including", "includes", "comprising", "comprises", "comprised" and the like) are intended to be inclusive and are not intended to exclude further features, components, integers, or steps.

For aspects of the disclosure that have been described using flowcharts, a given flowchart step could potentially be performed in various ways and by various devices, systems or system modules. A given flowchart step could be divided into multiple steps and/or multiple flowchart steps could be combined into a single step, unless the contrary is specifically noted as essential. Furthermore, the order of the steps can be changed without departing from the scope of the present disclosure, unless the contrary is specifically noted as essential.

Figure 12:
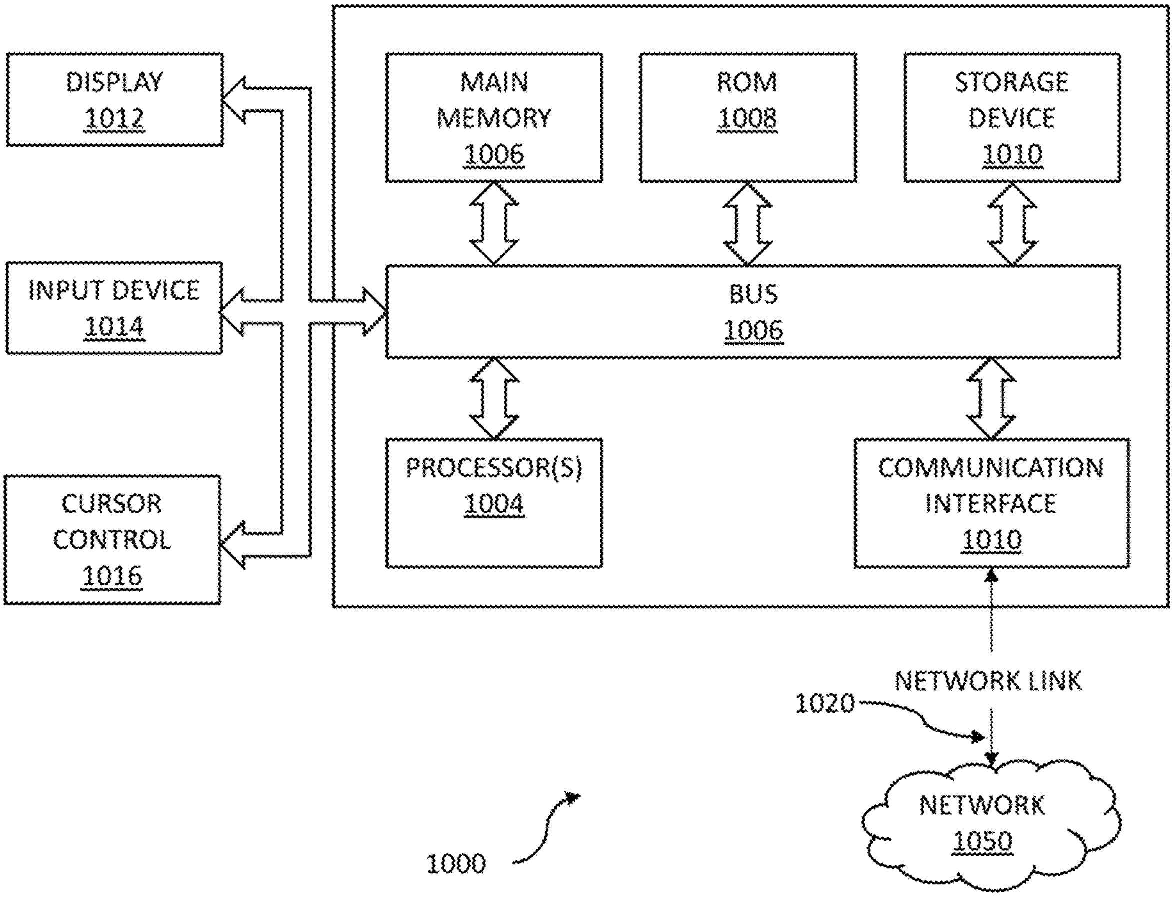
FIG. 12 is a schematic diagram of a computer system configured to implement an embodiment of the methods and systems described.

FIG. 12 provides a block diagram that illustrates one example of a computer system 1000 upon which embodiments of the disclosure may be implemented. Computer system 1000 includes a bus 1002 or other communication mechanism for communicating information, and a hardware processor system 1004 coupled with bus 1002 for processing information. Hardware processor system 1004 may be, for example, a general-purpose microprocessor, a graphics processing unit, other type of processing unit, or combinations thereof. In preferred embodiments, the hardware processor system 1004 includes multiple processing units, for example in the form of one or more processors with multiple processor cores, or multiple processor units. Such multiple processor units may be located on one or more peripheral cards connected to the bus 1002, e.g., as PCIe cards or the like. Each processing unit will typically include its own cache or caches for handling data during processing.

Computer system 1000 also includes a main memory 1006, such as a random access memory (RAM) or other dynamic storage device, coupled to bus 1002 for storing information and instructions to be executed by processor system 1004. Main memory 1006 also may be used for storing temporary variables or other intermediate information during execution of instructions to be executed by processor system 1004. Such instructions, when stored in non-transitory storage media accessible to processor system 1004, render computer system 1000 into a special-purpose machine that is customized and configured to perform the operations specified in the instructions.

Computer system 1000 may further include a read only memory (ROM) 1008 or other static storage device coupled to bus 1002 for storing static information and instructions for processor system 1004. A storage system 1010, such as a magnetic disk, SSD, optical disk or other mass storage device, may be provided and coupled to bus 1002 for storing information and instructions including the audio editing software application described above. Other storage may also be coupled to the computing system (not shown) to provide expanded storage capability. For example the computer system can be connected to one or more external data storage systems directly or via the communications interface 1018. The external data storage system may be a NAS data storage system or cloud data storage system.

The computer system 1000 may be coupled via bus 1002 to a display 1012 (such as an LCD, LED, touch screen display, or other display) for displaying information to a user via a graphical user interface. One or more input devices 1014 may be coupled to the bus 1002 for communicating information and command selections to processor system 1004. The input devices may include a keyboard or other input device adapted for entering alphanumeric information into the computer system 1000. The input device 1004 can also include a device specially adapted for audio editing and production, such as a mixing desk or mixing console (e.g., any of the Fairlight Desktop Console, Fairlight Advanced Consoles or Fairlight Desktop Audio editor from Blackmagic Design), or other similar audio mixer or control consoles from other manufacturers. Another type of user input device is cursor control 1016, such as a mouse, a trackball, or cursor direction keys for communicating direction information and command selections to processor system 1004 and for controlling cursor movement on display 1012.

According to at least one embodiment, the techniques herein are performed by computer system 1000 in response to processor system 1004 executing one or more sequences of one or more instructions contained in main memory 1006. Such instructions may be read into main memory 1006 from another storage medium, such as a remote disk or database. Execution of the sequences of instructions contained in main memory 1006 causes processor system 1004 to perform the process steps described herein. In alternative embodiments, hard-wired circuitry may be used in place of or in combination with software instructions.

The terms "storage media" or "storage medium" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Computer system 1000 may also include a communication interface 1018 coupled to bus 1002. Communication interface 1018 provides a two-way data communication coupling to a network link 1020 that is connected to communication network 1050. For example, communication interface 1018 may be an integrated services digital network (ISDN) card, cable modem, satellite modem, etc. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of a performing a plurality of data processing operations on a plurality of digital audio entities using a computer system having multiple data processing units, each digital audio entity comprising a plurality of samples, said method including:

allocating each data processing operation on a digital audio entity to one of said multiple data processing units of said computer system, such that said data processing operation is performed on said allocated one of said data processing units, wherein said allocation is based at least partly on an expected duration of execution for the data processing operation on said one of said data processing units to which it is allocated;

performing said plurality of data processing operations on said plurality of digital audio entities according to said allocation; and outputting processed audio.

2. The method of claim 1 wherein allocating each data processing operation to one of said data processing units includes identifying one or more realtime data processing operations that must be performed in a predetermined time period, and allocating said realtime data processing operations to be performed before non-realtime data processing operations.

3. The method of claim 1 wherein allocating each data processing operation to one of said data processing units includes identifying one or more realtime data processing operations that must be performed in a predetermined time period, and allocating said realtime data processing operations such that they are to be performed on separate data processing units to non-realtime data processing operations.

4. The method of claim 1 which further includes:

determining a revised allocation of each data processing operation to one of said data processing units.

5. The method of claim 4 wherein the method includes: allocating some or each data processing operation to one of said data processing units according to said revised allocation.

6. The method of claim 5 wherein either or both of:

allocating some or each data processing operation to one of said data processing units according to said revised allocation; and determining a revised allocation of each data processing operation to one of said data processing units;

is performed either, or both of periodically, or in response a re-allocation event.

7. The method of claim 6 wherein a re-allocation event is any one of the following events:

the plurality of data processing operations to be performed changes;

the plurality of digital audio entities changes;

an actual duration of execution of one or more data processing operations on its allocated data processing unit differs from a corresponding expected duration of execution by a predetermined amount;

said plurality of data processing operations to be performed on said digital audio entities are not completed in a predetermined time period using a current allocation;

it is determined that said plurality of data processing operations to be performed on said digital audio entities cannot be completed in a predetermined time period using a current allocation;

an alternative allocation has been identified that improves overall processing time or efficiency by a predetermined amount;

the number and/or permitted utilization of data processing units in the computer system has changed.

8. The method of claim 1 wherein determining an expected duration of execution for a data processing operation on said one of said data processing units includes accessing an execution time database containing expected duration of execution data.

9. The method of claim 8 wherein the expected duration of execution data includes one or more of:

standardized duration of execution data for a plurality of data processing operations; and customized duration of execution data for a plurality of data processing operations that indicate an expected duration of execution for said data processing operations on said computer system.

10. The method of claim 8, wherein the method further includes:

determining an actual duration of execution for a data processing operation; and updating the expected duration of execution data.

11. A method of a performing a plurality of data processing operations on a plurality of digital audio entities, comprising a plurality of samples, using a computer system having multiple data processing units, the method including:

determining if each data processing operation on a digital audio entity is a realtime data processing operation that must be performed in a predetermined time period, or a non-realtime data processing operation;

allocating each realtime data processing operation to one of said data processing units, such that said realtime data processing operation is performed on said one of said data processing units within the predetermined time period, wherein said allocation is based at least partly on an expected duration of execution for the realtime data processing operation on said one of said data processing units to which it is allocated;

allocating each non-realtime data processing operation to one of said data processing units, such that each said non-realtime data processing operation is performed on said one of said data processing units, wherein said allocation is based at least partly on an expected duration of execution for the non-realtime data processing operation on said one of said data processing units to which it is allocated;

performing said plurality of data processing operations on said plurality of digital audio entities according to said allocation; and outputting processed audio.

12. The method of claim 11 wherein the method includes allocating said realtime data processing operations before the allocation of non-realtime data processing operations.

13. The method of claim 11 wherein the method includes allocating realtime data processing operations such that they are to be performed on separate data processing units to non-realtime data processing operations.

14. The method of claim 11 wherein a non-realtime data processing operation can be performed in a time period twice as long as the predetermined time period.

15. The method of claim 11 wherein the multiple data processing units include one or more data processing units that are high speed processing units, and one or more data processing units that are low speed processing units, and wherein the method includes preferentially allocating realtime data processing operations to said high speed data processing units.

16. The method of claim 11 wherein at least the expected duration of execution for at least one realtime data processing operation is stored in an execution time database, and the method includes:

determining an actual duration of execution for at least one realtime data processing operation; and updating said execution time database.

17. The method of claim 16 which further includes determining a revised allocation of at least each realtime data processing operation to one of said data processing units using the updated execution time database.

18. The method of claim 17 wherein the method includes:

allocating some or each realtime data processing operation to one of said data processing units according to said revised allocation;

performing said plurality of data processing operations on said plurality of digital audio entities according to said revised allocation; and outputting processed audio.

19. An audio processing system including multiple data processing units, said audio processing system being configured to perform data processing operations on a plurality of digital audio entities, each digital audio entity comprising a plurality of samples, wherein each audio digital audio entity has at least one data processing operation performed on it, the audio processing system including a control unit arranged to allocate each data processing operation to one of said data processing units, such that said data processing operation is performed on said one of said data processing units, wherein the control unit performs said allocation at least partly on the basis of an expected duration of execution for the data processing operation on said one of said data processing units to which it is allocated.

20. The audio processing system of claim 19 wherein the control unit is arranged to identify one or more realtime data processing operations that must be performed in a predetermined time period, and allocate said realtime data processing operations to processing units such that said realtime processing units are performed before non-realtime data processing operations.

21. The audio processing system of claim 19 wherein the control unit generates a revised allocation of each data processing operation to one of said data processing units.

22. The audio processing system of claim 19 which further includes an execution time databased containing expected duration of execution data.

23. The audio processing system of claim 22 which further includes an execution monitoring component configured to determine an actual duration of execution for a data processing operation and update the execution time database.

24. A non-transitory computer readable medium configured to carry instructions, which when executed by a computer system, cause the computer system to perform a method as claimed in claim 1.

25. The non-transitory computer readable medium of claim 24 comprising instructions to implement a software application comprising any one of:

a digital audio workstation; and video editing software.

* * * * *